United States Patent [19]

Kückens

[11] 4,416,116
[45] Nov. 22, 1983

[54] THERMAL ENGINE ARRANGEMENT

[76] Inventor: Alexander Kückens, Schillerstrasse 22, 2067 Reinfeld/H., Fed. Rep. of Germany

[21] Appl. No.: 268,110

[22] Filed: May 28, 1981

[30] Foreign Application Priority Data

Mar. 21, 1981 [DE] Fed. Rep. of Germany ....... 3024016

[51] Int. Cl.³ ............................................. F03G 7/02
[52] U.S. Cl. .................................. 60/641.8; 60/641.6; 126/443; 126/450
[58] Field of Search ................. 60/641.1, 641.6, 641.8, 60/641.15, 651, 671; 126/433, 434, 437, 443, 450; 62/235.1; 237/2 B

[56] References Cited

U.S. PATENT DOCUMENTS

| | | | |
|---|---|---|---|
| 3,995,429 | 12/1976 | Peters | 60/671 X |
| 4,184,477 | 1/1980 | Yuan | 126/433 |
| 4,261,333 | 4/1981 | Guarnaschelli | 126/427 |
| 4,280,328 | 7/1981 | Falconer | 126/433 |

Primary Examiner—Allen M. Ostrager
Assistant Examiner—Peggy A. Loiacano

Attorney, Agent, or Firm—Barnes, Kisselle, Raisch, Choate, Whittemore & Hulbert

[57] ABSTRACT

A thermal engine arrangement comprising a series circuit charged with a vaporizable refrigerating medium, thermal fluid including a storing and preheating tank, an evaporator connected to the storing and preheating tank, a hood enclosing the storing and preheating tank and evaporator directly exposed to the heat of the air and to solar radiation defining a common heating chamber for the storing and preheating tank and evaporator, a thermal engine connected to the evaporator driven by evaporated thermal fluid from the evaporator, a condenser connected to the thermal engine for receiving spent thermal fluid therefrom, a collector tank connected to the condenser for receiving condensate therefrom and a condensate pump connected between the collecting tank and storing and preheating tank for transferring condensed thermal fluid from the collector tank to the storing and preheating tank. Said condenser and collecting tank being located beneath the surface of the ground in direct heat transfer with the ground. Said condenser being adapted to be selectively connected to the heat receiving side of a heat pump. And selectively operable means for heating the thermal fluid.

8 Claims, 1 Drawing Figure

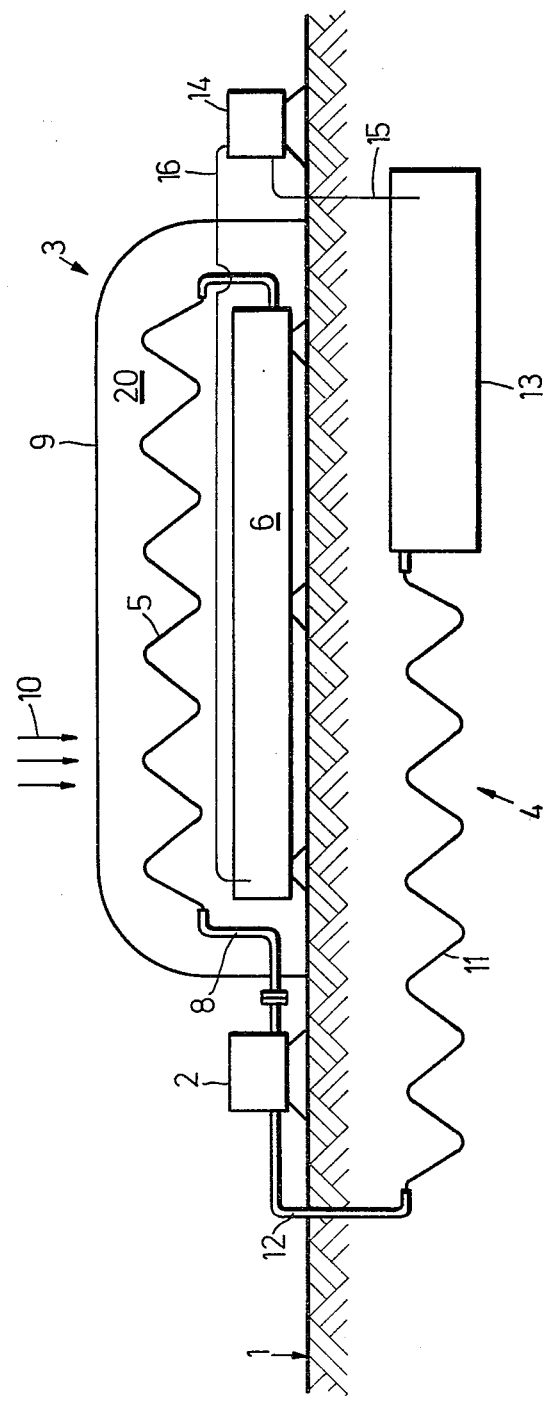

THERMAL ENGINE ARRANGEMENT

The invention relates to a thermal engine arrangement comprising a vaporizable refrigerating medium, which is conducted in a closed circuit and serves as the thermal fluid, a fluid evaporator, a thermal engine fed by the same and a fluid condenser connected with said fluid evaporator via a condensate pump.

It has been known to supply thermal engine arrangements comprising a heat pump for heating and evaporating the thermal fluid with a refrigerating medium as the thermal fluid, such as Freon 12. But there may also be employed other refrigerating media (see Austrian Pat. No. 318,979). In this known arrangement the necessary heat is applied to the thermal medium via a heat pump which derives the heat required for heating and evaporating the thermal fluid from a natural heat source, such as river water, air or soil, respectively, in which case the river water cooled via the heat pump is fed to the condenser of the arrangement in order to again condense the exhaust steam of the turbine. In this instance the thermal engine is a turbine. Proceeding from a temperature of the river water amounting to 20° C., the latter is cooled down to a temperature of 10° C. The liquid Freon 12 leaving the condenser at the same temperature is heated by the river water to 20° C., whereupon it is conducted to the evaporator in which the Freon 12 is heated by the heat side of the heat pump up to a temperature of 40° C. This known arrangement is subject to comparatively great expenditure and requires a considerable energy input in order to elevate by means of the heat pump the temperature of a natural heat source to the degree as required for evaporating the refrigerating agent.

It is the problem of the present invention to so improve a thermal engine arrangement of the type referred to as to allow said arrangement to operate with a substantially reduced energy input, simplifying at the same time also the construction thereof.

This problem is solved in that the fluid evaporator is provided with an evaporator member capable of being heated by the air temperature and/or by solar radiation and the condenser is provided with a member being in heat exchange with the soil. To serve this purpose there is employed a refrigerating medium suited for the temperature range in question, for instance the refrigerating medium known by the designation "R 11" capable of evaporation already within a temperature range slightly above 20° C. The heat required for evaporating is derived from the air or from natural heat radiation to which the air is exposed. No particular measures nor agents, especially no energy input, are required in order to achieve sufficient cooling of the exhaust steam in the condenser. To arrive at this aim, the residual heat present in the condensate is conducted into the soil. This offers the essential advantage that the ground, at a depth of only a few meters, has a comparatively low temperature largely independent of the external conditions, which temperature is markedly below the condensation temperature of the respective refrigerating media. Hence, under adequate external circumstances practically no appreciable energy input, apart from such means as for instance feed pumps for the condensate, is required for operating the arrangement. With the new thermal engine arrangement it is thus possible to utilize the natural temperature gradient between the temperature of the air or of solar radiation, respectively, and the temperature of the soil for direct energy or power generation. Hence, the arrangement is especially suited for employment in such cases in which virtually no foreign energy or only very low energy is available, whereas the air temperature or radiation temperature represents a reliable heat source. The arrangement can very simply and quickly be installed. In this connection it is of special advantage for the evaporator member exposed to the heat or air or radiation, respectively, to be arranged within a heating chamber protected from the outside by a hood or the like, thus utilizing the known greenhouse effect for reaching an optimum temperature by taking advantage of the heat yielded by the air or solar radiation, respectively. This will at the same time make it possible for the thermal engine arrangement to be employed also under less favourable external conditions and/or with still greater efficiency.

It is expedient to primarily pump the condensate into a preheater likewise arranged under the hood within the heating chamber, said preheater being connected to the thermal engine, which is preferably a turbine but may also be a piston engine, via an evaporator coil or another evaporator member spreading the thermal fluid in a thin layer.

The heat of the exhaust steam of the thermal engine transferred to the soil can be stored for a limited period of time in the environmental ground, it being a known fact that most soil formations not directly situated in groundwater have comparatively high heat insulating characteristics. This fact can be advantageously used for withdrawing again in periods of low air temperature and/or solar radiation the heat stored in the soil by means of the condenser element disposed above the ground and elevating the temperature to a level permitting re-employment via a heat pump selectively to be connected to the condenser member.

The invention is hereinafter more closely explained in conjunction with diagrammatic drawings representing an exemplified embodiment.

The only FIGURE is a schematic representation of a thermal engine arrangement according to the present invention.

In said representation the soil surface is referred to by 1. The evaporator 3 of the arrangement is provided above ground, while the condenser 4 is disposed below the surface of the soil at sufficient depth down to 6 meters.

Between evaporator and condenser the thermal engine 2 is indicated. It may be a piston engine but preferably is a steam turbine. Via conduits 8 and 12, respectively, the thermal engine is in communication with the evaporator 3 or the condenser 4, respectively.

The evaporator may be provided with an elongated container 6 forming the preheater for the thermal fluid. The thermal fluid is a refrigerating medium, such as known under the designation "R 11". The refrigerating agent is conducted in a closed circuit within the arrangement. Secured to the preheater 6 is an evaporator member 5, for instance in the form of a serpentine tube or a plane evaporator. The evaporator member 5 and preferably also the preheater 6 are arranged within a heating chamber 20. The latter is defined by a hood or like dome-shaped housing 9 transparent to heat and to solar radiation. This hood permits to use the known greenhouse effect observed in hothouses or the like and which enables the air confined in the heating chamber 20 to be maintained at a temperature substantially higher than the outside atmosphere. This temperature is utilized for evaporating the refrigerating agent in the evaporator member 5. The elevated temperature within the heating chamber 20 is simultaneously used for heating the condensate in the preheater 6 to a higher temperature.

The driving fluid is fed from the evaporator member 5 to the thermal engine 2. The exhaust steam of the thermal engine is introduced via a condenser member 11 arranged in the soil at sufficient distance from the soil surface, so that the exhaust steam under the action of the soil temperature is caused to condense in the condenser member 11. The condensate can be fed directly to the preheater 6 by means of a condensate pump 14. In some cases it may also be expedient to feed the condensate to a collecting tank 13, from which it is drawn off by the pump 14 and fed to the preheater 6 via the conduit 16. The condenser arrangement in the soil may also be to the effect that the condenser member having the form of a coil 11, which is in direct heat contact with the soil, surrounds the elongated condenser tank 13 helically or flatly, so that the tank 13 is placed in an area of the soil which, due to the heat emitted by the condenser member 11 is of somewhat elevated temperature as compared to the average soil temperature at the respective depth. In view of the known fact that earth is not a very good thermal conductor, the soil assumes a higher temperature by the heat received from the condenser member 11 and will also retain the same over a relatively long period of time also when the heat supply is interrupted or ceases. This offers the advantage that the heat thus stored in the soil may be withdrawn again therefrom during a limited period of time. This can be achieved in a simple way in that the condenser member 11, if necessary, is connected to act as the heat-receiving portion of a thermal pump (not shown) which, for a limited period of time, withdraws again from the thermal fluid the heat stored in the soil, utilizing it again at a respective higher temperature. This heat withdrawn again from the soil may for instance be utilized again for an additional heating means (not shown) assigned to the evaporator member 5, which helps to maintain the desired evaporator temperature also in cases where the heat yielded by air and/or solar radiation does not reach a sufficiently high temperature.

I claim:

1. A thermal power engine arrangement comprising a closed series circuit for a vaporizable refrigerating agent utilized as the thermal fluid for the engine including, a condensate storing and preheating tank, an evaporator connected to said storing and preheating tank, a hood enclosing the storing and preheating tank and evaporator directly exposed to the heat of the air and to solar radiation and defining a common heating chamber for the storing and preheating tank and evaporator, a thermal power engine connected to the evaporator and drivable by vaporized refrigerating agent, a condenser connected to the engine to receive refrigerant from the engine, and a condensate pump connected to the condenser for conveying the condensate from the condenser into the storing and preheating tank and a vaporizable refrigerating agent thermal fluid in the closed series circuit.

2. Structure as set forth in claim 1, and further including selectively operable additional means for heating the thermal fluid operably associated with the thermal fluid.

3. Structure as set forth in claim 2, wherein the condenser is a tubular coil.

4. A thermal power engine arrangement comprising a closed series circuit for a vaporizable refrigerating agent utilized as the thermal fluid for the engine including, a condensate storing and preheating tank, an evaporator connected to said storing and preheating tank, a hood enclosing the storing and preheating tank and evaporator directly exposed to the heat of the air and to solar radiation and defining a common heating chamber for the storing and preheating tank and evaporator, a thermal power engine connected to the evaporator and drivable by vaporized refrigerating agent, a condenser connected to the engine to receive refrigerant from the engine, a condensate collecting tank connected to the condenser for receiving condensate from the condenser, and a condensate pump connected to the collecting tank and storing and preheating tank for conveying the condensate from the collecting tank into the storing and preheating tank and a vaporizable refrigerating agent in the closed series circuit.

5. A thermal power engine arrangement comprising a closed series circuit for a vaporizable refrigerating agent utilized as the thermal fluid for the engine including, a condensate storing and preheating tank, an evaporator connected to said storing and preheating tank, a hood enclosing the storing and preheating tank and evaporator directly exposed to the heat of the air and to solar radiation and defining a common heating chamber for the storing and preheating tank and evaporator, a thermal power engine connected to the evaporator and drivable by vaporized refrigerating agent, a condenser coil connected to the engine to receive refrigerant from the engine, a condensate collecting tank connected to the condenser coil for receiving condensate from the condenser coil, said condenser coil and collecting tank being located at a predetermined depth beneath the ground surface in direct heat transfer contact with the ground and a condensate pump connected to the collecting tank and storing and preheating tank for conveying the condensate from the collecting tank into the storing and preheating tank and a vaporizable refrigerating agent in the closed series circuit.

6. Structure as set forth in claim 5, wherein the condenser is a tubular coil.

7. Structure as set forth in claim 5, and further including means for selectively connecting the tubular condenser coil to the heat receiving side of a heat pump.

8. Structure as set forth in claim 5, and further including selectively operable additional means for heating the thermal fluid operably associated with the thermal fluid.

* * * * *